(12) United States Patent
Oesterling et al.

(10) Patent No.: US 10,229,601 B2
(45) Date of Patent: Mar. 12, 2019

(54) SYSTEM AND METHOD TO EXHIBIT VEHICLE INFORMATION

(71) Applicants: GM GLOBAL TECHNOLOGY OPERATIONS LLC, Detroit, MI (US); GENERAL MOTORS, LLC., Detroit, MI (US)

(72) Inventors: Christopher L. Oesterling, Troy, MI (US); Donald K. Grimm, Utica, MI (US); Amy E. Hurley, Royal Oak, MI (US); Aditya S. Kamini, Bloomfield Hills, MI (US)

( * ) Notice: Subject to any disclaimer, the term of this patent is extended or adjusted under 35 U.S.C. 154(b) by 172 days.

(21) Appl. No.: 15/418,979

(22) Filed: Jan. 30, 2017

(65) Prior Publication Data

US 2018/0218613 A1 Aug. 2, 2018

(51) Int. Cl.
| | |
|---|---|
| G08G 1/16 | (2006.01) |
| G07C 9/00 | (2006.01) |
| H04W 4/80 | (2018.01) |
| G07C 5/00 | (2006.01) |
| G08G 1/00 | (2006.01) |
| G08G 1/005 | (2006.01) |
| G08G 1/02 | (2006.01) |
| G08G 1/04 | (2006.01) |
| G08G 1/042 | (2006.01) |
| G08G 1/095 | (2006.01) |
| H04W 4/44 | (2018.01) |
| H04W 4/38 | (2018.01) |

(52) U.S. Cl.
CPC ............ *G08G 1/168* (2013.01); *G07C 5/008* (2013.01); *G07C 9/00015* (2013.01); *G07C 9/00111* (2013.01); *G08G 1/005* (2013.01); *G08G 1/02* (2013.01); *G08G 1/04* (2013.01); *G08G 1/042* (2013.01); *G08G 1/095* (2013.01); *G08G 1/205* (2013.01); *H04W 4/44* (2018.02); *H04W 4/80* (2018.02); *H04W 4/38* (2018.02)

(58) Field of Classification Search
CPC  G07C 5/008; G07C 9/00015; G07C 9/00111; G08G 1/005; G08G 1/02; G08G 1/04; G08G 1/042; G08G 1/095; G08G 1/168; G08G 1/205; H04W 4/80
See application file for complete search history.

(56) References Cited

U.S. PATENT DOCUMENTS

| | | |
|---|---|---|
| 5,131,053 A | 7/1992 | Bernzott |
| 6,394,557 B2 | 5/2002 | Bradski |
| 7,587,064 B2 | 9/2009 | Owechko |
| 9,886,855 B2 | 2/2018 | Oesterling |
| 2008/0030373 A1* | 2/2008 | Montgomery ......... G07B 15/02 340/932.2 |

(Continued)

*Primary Examiner* — Omer S Khan (57) ABSTRACT

A system to exhibit vehicle information is presented herein. The system includes a data center, vehicle, and sign. The data center includes a memory, long-range transceiver, and server. The memory is configured to have one or more vehicle share records. The long-range transceiver is configured to transmit and receive one or more data transmissions over a long-range communication channel. The server is configured to communicably couple with the memory and long-range transceiver. The server is also configured to operate the long-range transceiver to transmit the vehicle-share records as data transmissions over the long-range communication channel.

15 Claims, 3 Drawing Sheets

(56) References Cited

U.S. PATENT DOCUMENTS

| | | | |
|---|---|---|---|
| 2009/0232358 A1 | 9/2009 | Cross | |
| 2009/0325612 A1* | 12/2009 | Oesterling | H04W 4/14 |
| | | | 455/466 |
| 2011/0255743 A1 | 10/2011 | Guan | |
| 2014/0335897 A1* | 11/2014 | Clem | G08G 1/0112 |
| | | | 455/456.3 |
| 2017/0371608 A1* | 12/2017 | Wasserman | G06F 3/14 |

* cited by examiner

SYSTEM AND METHOD TO EXHIBIT VEHICLE INFORMATION

BACKGROUND

Vehicle sharing and self-serve vehicle rental services allow consumers to make reservations for station-based use of vehicles, particularly in urban environments. These rental vehicles are often located in reserved parking spaces identified with permanently mounted signs or markers. Ideally, a user picks up a vehicle from a reserved parking space and returns the vehicle to that parking space or a similarly designated space. However, as these parking spaces are often found in public parking lots, users are left with little to determine a vehicle's status information. This can frustrate the user and prevent them from renting the vehicle in a timely manner. Accordingly, it is desirable to provide a system and method for identifying vehicle rental status information.

SUMMARY

A system to exhibit vehicle information is presented herein. The system includes a data center, vehicle, and sign. The data center includes a memory, long-range transceiver, and server. The memory is configured to have one or more vehicle share records. The long-range transceiver is configured to transmit and receive one or more data transmissions over a long-range communication channel. The server is configured to communicably couple with the memory and long-range transceiver. The server is also configured to operate the long-range transceiver to transmit the vehicle-share records as data transmissions over the long-range communication channel.

The vehicle includes a communication device and telematics unit. The communication device is configured to transmit and receive one or more data transmissions over a short-range communication channel. The telematics unit is configured to communicably couple with the communication device. The telematics unit is also configured to transmit and receive one or more data transmissions over the long-range communication channel. The telematics unit is further configured to operate the communication device to transmit one or more data transmissions over the short-range communication channel.

The sign includes a short-range transceiver, display, and processor module. The short-range transceiver is configured to transmit and receive one or more data transmissions over the short-range communication channel. The display is configured to exhibit information. The processor module is configured to communicably couple with the short-range transceiver and the display. The processor module is further configured to receive the one or more data transmissions from the short-range transceiver. Moreover, the processor module is configured to generate a notification when the processor module determines that the one or more data transmissions include vehicle-share records information. Additionally, the processor module is configured to operate the display to exhibit the notification.

The system may include a second memory on the sign. The second memory is configured to store the vehicle-share records information or the notification or both the vehicle-share records information and the notification. Moreover, the short-range transceiver is configured to transmit the stored vehicle-share records information or the notification or both the vehicle-share records information and the notification as one or more data transmissions over the short-range communication channel.

The system may also include a mobile computing device including a second long-range transceiver configured to transmit and receive one or more data transmissions over the long-range communication channel. Moreover, the mobile computing device is configured to receive the data transmissions from the second long-range transceiver. The mobile computing device is also configured to generate modified vehicle-share records when the mobile computing device determines that the one or more data transmissions include vehicle-share records information. And the mobile computing device is configured to operate the second long-range transceiver to transmit the modified vehicle-share records as one or more data transmissions over the long-range communication channel.

The mobile computing device may further include a second short-range transceiver configured to communicate one or more data transmissions over the short-range communication channel. Moreover, the mobile computing device may be configured to operate the second short-range transceiver to transmit the modified vehicle-share records as one or more data transmissions over the short-range communication channel. The short-range communication channel may be a near-field communication channel. In such an instance, the mobile computing device is configured to detect being within a close proximity to the short-range transceiver. Moreover, the mobile computing device may be configured to operate the second short-range transceiver to transmit the modified vehicle-share records as one or more data transmissions over the short-range communication channel while within the close proximity.

The notification may include vehicle-share services reservation account information, reservation time-share information, vehicle return expectation information, or any combination thereof. The communication device may be further configured to transmit a vehicle identification key over the short-range communication channel. In addition, the short-range transceiver may be further configured to receive the vehicle identification key over the short-range communication channel.

Moreover, the notification may incorporate an alert when an unapproved vehicle is identified to be in the parking space upon on a determination of the vehicle identification key status of the processor module.

The vehicle may further include a sensor configured to perform vehicle diagnostics to generate diagnostic data, the sensor configured to communicably couple with the telematics unit. Moreover, the telematics unit may be configured to operate the communication device to transmit the diagnostic data as one or more data transmissions over the short-range communication channel.

In some embodiments, the sign may further include a motion sensor and camera. The motion sensor may be configured to sense motion in the parking space and communicate motion data; whereas, the camera configured to record images of the parking space. The processor module may be configured to communicably couple to the motion sensor and camera. The processor module may also be configured to receive the motion data and subsequently operate the camera to record images of the parking space.

In one or more other embodiments, the sign may further include a camera configured to record images of the parking space. In these embodiments, the parking space may include a ground sensor configured to sense an object in the parking space and communicate object data. Moreover, the processor module may be configured to communicably couple to the ground sensor and camera. The processor module may also be configured to receive the object data and subsequently operate the camera to record images of the parking space.

A method for exhibiting vehicle information is also presented herein. The method includes the steps of: providing a data center including: a memory configured to include one or more vehicle share records; a long-range transceiver configured to transmit and receive one or more data transmissions over a long-range communication channel; a server configured to communicably couple with the memory and long-range transceiver; providing a vehicle including: a communication device configured to transmit and receive one or more data transmissions over a short-range communication channel; a telematics unit configured to communicably couple with the communication device, the telematics unit configured to transmit and receive one or more data transmissions over the long-range communication channel, the telematics unit configured to operate the communication device to transmit the data transmissions over the short-range communication channel; providing a sign including: a short-range transceiver configured to transmit and receive one or more data transmissions over the short-range communication channel; a display configured to exhibit information; and a processor module configured to communicably couple with the short-range transceiver and the display, the processor module configured to receive the one or more data transmissions from the short-range transceiver; operating the long-range transceiver, via the server, to transmit data transmissions; transmitting, via the long-range transceiver, data transmissions including the vehicle-share records over the long-range communication channel; receiving the data transmissions, via the telematics unit; operating the communication device, via the telematics unit, to transmit the data transmissions over the short-range communication channel; transmitting one or more data transmissions, via the communication device, over the short-range communication channel; receiving the data transmissions, via the short-range transceiver; communicating the data transmissions, via the short-range transceiver, to the processor module; determining, via the processor module, whether the data transmissions include vehicle-share records information; generating a notification, via the processor module, when the data transmissions include vehicle-share records information; operating, via the processor module, the display to exhibit information; and exhibiting the notification, via the display.

The above features and advantages and other features and advantages of the present teachings are readily apparent from the following detailed description for carrying out the teachings when taken in connection with the accompanying drawings.

DESCRIPTION OF THE DRAWINGS

The disclosed examples will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
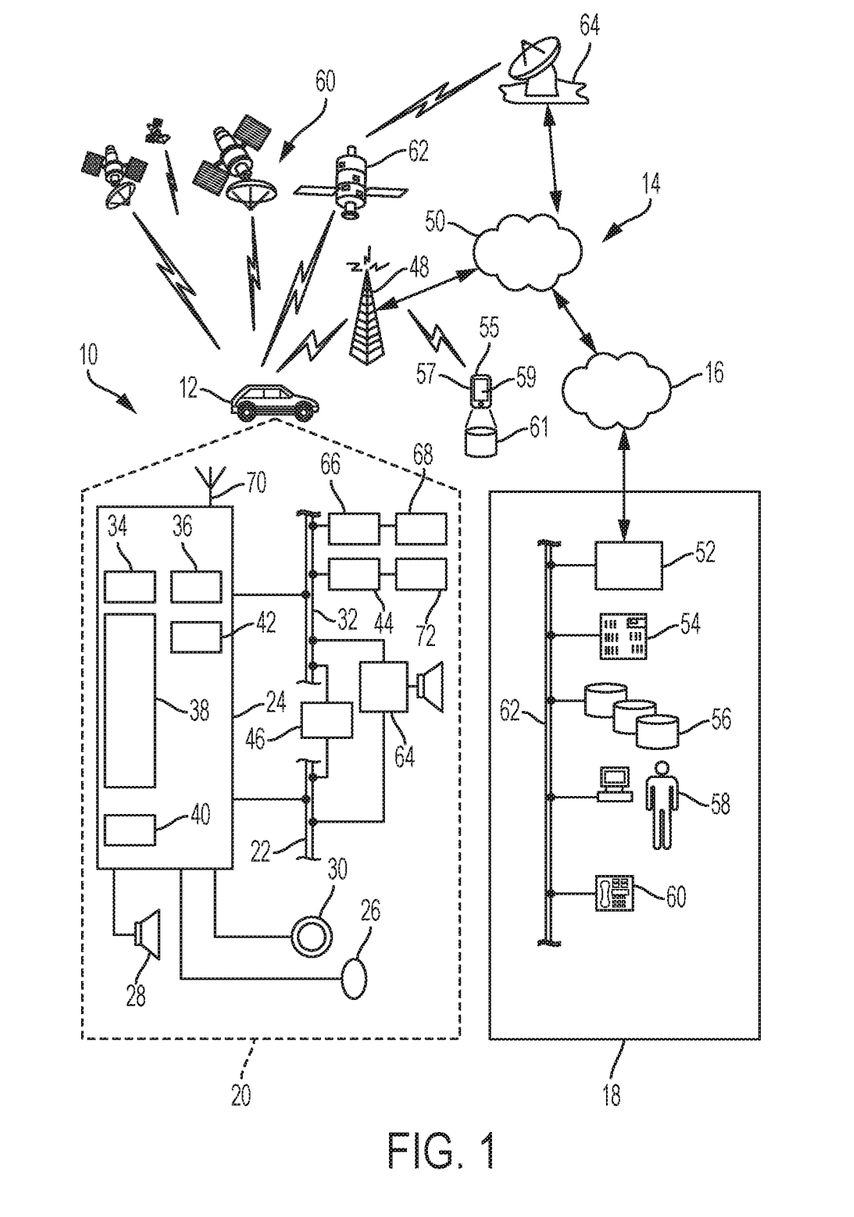
FIG. 1 is a diagram illustrating an exemplary embodiment of a communication system according to an aspect of the system and method presented herein.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a data center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, short-range wireless communication device 26, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its long-rang communications with the data center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or code segment adapted to be executed within electronic processing device 38.

The telematics unit 24 may provide various services including: turn-by-turn directions and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the long-range transceiver, which includes both a cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34. GNSS chipset/component 42 may receive radio signals from a constellation 60 of GPS satellites. From these signals, the GNSS chipset/component 42 can determine vehicle position used for providing navigation and other position-related services to the vehicle driver. Navigation information can be presented on an on-board vehicle display (or other display within the vehicle) or can be presented verbally such as is done when supplying turn-by-turn navigation.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 (VSMs) in the form of electronic hardware components located throughout the vehicle and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing and another VSM 44 can be a powertrain control module that regulates operation of one or more components of the vehicle powertrain. Another VSM 44 can be a body control module (BCM) that governs various electrical components located throughout the vehicle, like the vehicle's power door locks, engine ignition, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

A passive entry passive start (PEPS) module is another type of VSM 44 that can be connected to the vehicle bus 32 and provide passive detection of the absence or presence of a passive physical key or a virtual vehicle key. When the passive physical key or a mobile computing device 57 with virtual vehicle key approaches, the PEPS module 44 can determine if the passive physical key belongs to the vehicle 12 and/or (in some embodiments) determine if the virtual vehicle key is authorized/authentic. If the virtual vehicle key is authentic, the PEPS module 44 can send a command to the BCM permitting access to the vehicle 12. As is appreciated by those skilled in the art, the above-mentioned VSMs are only examples of some of the modules that may be used in vehicle 12, as numerous others are also possible.

Wireless carrier system 14 may be a long-range wireless channel such as, but not limited to, a cellular telephone system or any other suitable wireless system that transmits signals between the vehicle hardware 20 and land network 16. According to an example, wireless carrier system 14 includes one or more cell towers 48.

Apart from using wireless carrier system 14, a different long-range wireless channel in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 can be a conventional land-based telecommunications network that is connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

One of the networked devices that can communicate with the telematics unit 24 is the mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with wireless carrier system 14 or satellites 62, a digital camera 55, a visual display 59, and/or a GPS module capable of receiving GPS satellite signals and generating GPS coordinates based on those signals. In some implementations, the display 59 also includes an interactive touch-screen graphical user interface. Digital camera 55 may include the ability to generate digital images which are bitmapped data representations of tangible objects captured and stored by generally known operations of camera 55. Examples of the mobile computing device 57 include the iPhone™ and Apple Watch™ each being manufactured by Apple, Inc. and the Droid™ smart phone that is manufactured by Motorola, Inc. as well as others.

Mobile device 57 may be used inside or outside of a vehicle (such as the vehicle 12 shown in FIG. 1), and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection channel (e.g., Bluetooth Low Energy, Wi-Fi, etc.), mobile computing device 57 and telematics unit 24 may pair with each other (or link to one another) on a case-by-case basis when within a wireless range. This unique pairing may also allow mobile computing device 57 to act as a key fob to operate vehicle 12 through telematics unit 24. In order to pair in this manner, a set of unique encryption keys may be sent to both mobile computing device 57 and telematics unit 24. Data center 20 may moreover participate. For example, the data center 20 may generate the encryption keys as well as a corresponding access token for both telematics unit 24 and mobile computing device 57.

Data center 18 is designed to provide the vehicle hardware 20 with a number of different system backend functions and, according to the example shown here, generally includes one or more switches 52, servers 54, databases 56, advisors 58, as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Server 54 can incorporate a data controller to control its operations. Server 82 may control data information as well as telecommunication/computer equipment 60 to send and/or receive the data information (i.e., data transmissions) from one or more of database 56, telematics unit 24, and mobile computing device 57. Database 56 could be a memory device designed to hold one or more vehicle-share services records (i.e., vehicle reservation information) having information such as, but not limited to, vehicle-share services reservation account information (e.g., reservation cost), reservation time-share information (e.g., a reservation calendar with vehicle availability), vehicle return expectation information, or any other pertinent vehicle reservation information. This backend information being stored and generated could moreover be written in SQL (structured query language). One embodiment of the backend information may be created such that each record is organized through a tabular form (spreadsheet).

For example, the user of mobile computing device 57 may create their own personalized vehicle-share services reservation account ("reservation account") to be stored in database 56. The user may perform tasks to create this account through a variety of devices such as remote computer 18 and mobile computing device 57 or through live advisor 86 at data center 20. The user account may be accessible on server 82 (i.e., to support backend functions). Data center 20 may also access one or more additional remote servers and/or remote databases (e.g., Department of Motor Vehicles databases) to receive information in support of the reservation account.

The user account may include validating data to verify and/or validate that future login attempts are secure (e.g., granting access only to the user). The validating data may include an account username and account password as well as user information (e.g., driver's license number), mobile computing device information such as, for example, the unique mobile device identifier (i.e., serial number). The user account may additionally store a variety of user preferences.

Although the illustrated example has been described as it would be used in conjunction with a data center 18 that is manned, it will be appreciated that the data center 18 can be any central or remote facility, manned or unmanned, mobile or fixed, to or from which it is desirable to exchange voice and data.

Parking Space Sign

Figure 2:
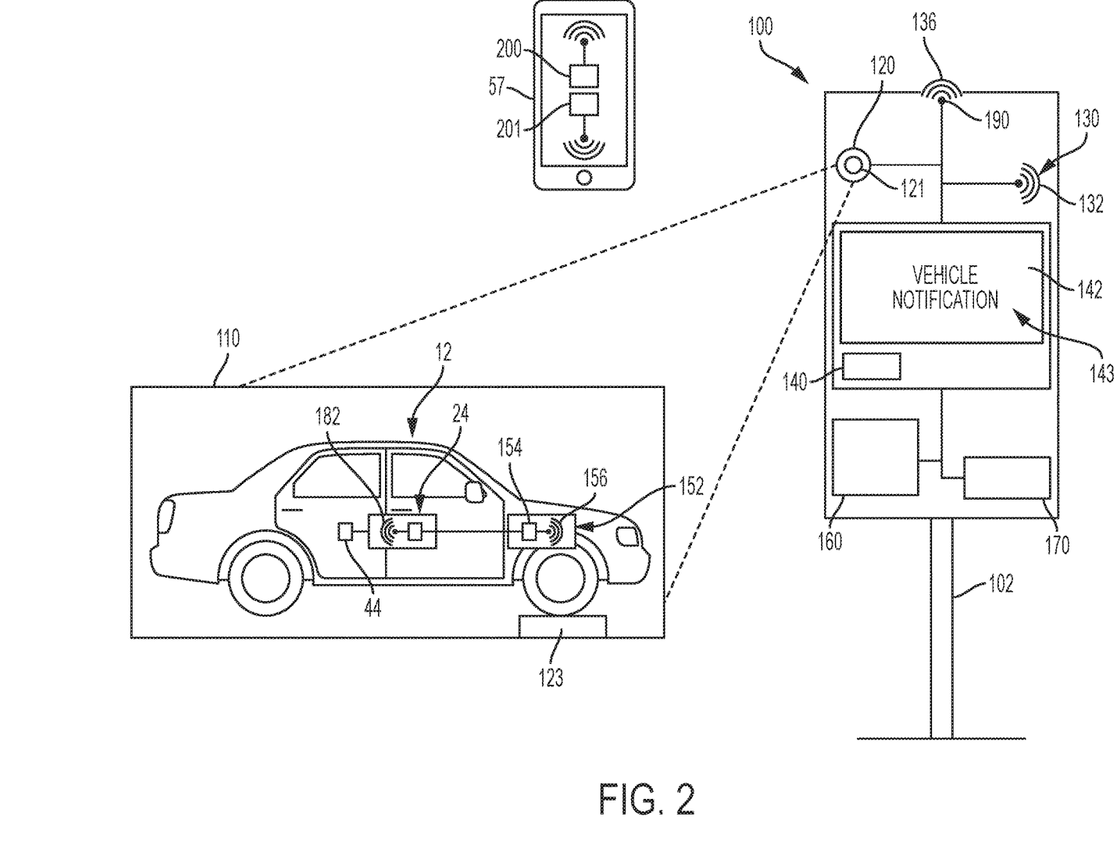
FIG. 2 is a diagram illustrating an exemplary embodiment of a sign to exhibit vehicle information at a parking space according to an aspect of the system and method presented herein.

The sign 100 for exhibiting vehicle information of a vehicle 12, parked in parking space 110, generally includes a motion sensor 120, camera 121, short-range transceiver 130, processor module 140, and display 142. As shown in FIG. 2, the sensor 120 is configured to monitor motion conducted in the parking space 110 and generate data after motion is detected. The camera 121 is configured to record digital images of a parking space 110. The short-range transceiver 130 is configured to transmit and receive data transmissions over a short-range communication channel 132. A separate yet corresponding ground sensor 123, located on the floor of parking space 110, is configured to sense an object in the parking space and communicate object data.

The processor module 140 is communicatively coupled with the display 142, memory module 160, and the short range transceiver 130. Processor module 140 is moreover configured to receive data transmissions from the short-range transceiver 130. The processor module 140 is further configured to generate notification information 143 when the processor module 140 determines that the data transmissions include vehicle-share records information (discussed above). The processor module 140 is further yet configured to operate display 142 to exhibit this generated notification information 143.

A communication device 152 is positioned onboard vehicle 12 which includes a vehicle short-range transceiver 156 to transmit and receive one or more data transmissions over a short-range communication channel 132 (e.g., Bluetooth, Bluetooth low power, Wi-Fi, etc.). Communication device 152 moreover communicates with and is operated by telematics unit 24 (FIG. 1) and may, in certain instances, further include the vehicle identification key 154.

One or more VSMs 44 are positioned within vehicle 12 and, as discussed above, perform vehicle diagnostics as well as generate diagnostic data. These VSMs 44 may moreover communicate with communication device 152 via telematics unit 24. In this way, the diagnostic sensor data may be transmitted over short-range communication channel 132.

Sign 100 can be installed on a sign post 102, a wall (not shown), or otherwise positioned so as to monitor the parking space 110. Reserved parking spaces are often marked with a sign, plaque, or marker having indicia used to convey that the parking space 110 is reserved and not to be used by the general public. For example, while not depicted herein, the sign 100 may feature a corporate design or other symbol associated with a vehicle rental service. The sign 100 may also look similar to a conventional parking sign, i.e. a sign without the monitoring and display capabilities described herein. In this way, the sign 100 is indistinguishable from a conventional parking sign and does not immediately convey the increased monitoring capabilities so that the sign 100 can inconspicuously monitor the parking space 110.

Display 142 is visible by a vehicle 12 in the parking space 110 or a bystander in close proximity to sign 100. Display 142 is configured to exhibit or otherwise convey notification information 143 generated by processor module. Display 142 thus exhibits information relating to the vehicle-share records. Display 142 may, for example, be a graphics display such as, but not limited to, a LCD, LED, or OLED that can exhibit information on sign 100 and is large enough for the information to be visible to a person in vehicle 12 or to any bystander within the environment around parking space 110.

The short-range transceiver 130 is configured to transmit and receive data transmissions over the short-range communication channel 132 and, in certain instances, receive vehicle identification key 154. The short-range transceiver 130, for example, receives one or more data transmissions from communication device 152 when vehicle 12 is within transmission range of the short-range communication channel 132.

Only approved vehicles are equipped with communication devices 152 having the vehicle identification key 154 and the vehicle short-range transceiver 156. The short-range transceiver 130 may therefore also receive the vehicle identification key 154 when the approved vehicle is parked in the parking space 110 or when an approved vehicle approaches the sign 100. When a non-approved vehicle is within parking space 110, processor module may determine now vehicle identification key 154 exists and in turn generate a notification that has an alert expressing a non-approved vehicle is in parking space 110.

The sign 100 may further include a memory module 160 configured to store the vehicle-share record information sent from communication device 152 and/or generated notification information 143 from processor module 140. Memory module 160 enables sign 100 to exhibit information through display 142 sometime after the approved vehicle 12 has exited parking space 110.

The processor module 140 is additionally communicatively coupled with sensor 120, camera 121, and remote ground sensor 123. The processor module 140 is configured to determine whether a data transmission from a vehicle 12 in the parking space 110 has vehicle record information. The term "module" as used herein refers to a combination of hardware, software, and/or firmware. The processor module 140 includes an integrated circuit associated with non-transitory medium to store code to be executed by the integrated circuit.

The sensor 120 is arranged in sign 100 to monitor parking space 110 and generate sensor data. Sensor 120 can be a motion sensor or an ultrasonic sensor, or a combination thereof. In addition, sensor 120 and camera 121 may be used in combination in the sign 100. For example, the camera may only capture video or images when the motion sensor detects movement or a change in the state of the parking space 110. An exterior portions of sensor 120 and camera 121 (e.g., the lens), may be disguised or hidden within the design or indicia on the exterior of sign 100, to prevent both sensor 120 and camera 121 from being easily visible. Such an arrangement helps sign 100 inconspicuously monitor parking space 110.

The ground sensor 123 is lies flat onto parking space 110 to monitor objects in parking space 110 (i.e., via the movement of the object) and generate object data. Ground sensor 123 can be a pair of wired magnetic loops and a force sensor. For example, the magnetic loops detect objects (e.g., vehicles) and can estimate their speed. Furthermore, the force sensors may be, for example, piezoelectric plates, load cells, or bending plate sensors that measure the instantaneous force applied by a portion of the object (e.g., vehicle tires). In addition, ground sensor 123 and camera 121 may be used in combination. For example, the camera 121 may only capture video or images when ground sensor 123 detects an object in the parking space 110. Exterior portions of ground sensor 120 may be disguised or hidden within the design or indicia on parking space 110, to prevent ground sensor 123 from being easily visible. Such camouflage helps sign 100 inconspicuously monitor parking space 110.

Sign 100 may also have a power source 170 such as a battery to provide electrical power to the sign 100. Power source 170 may further include a solar panel or a hardwired power source.

Sign 100 may include a long-range transceiver 134 configured to receive and transmit data over a long-range communication channel 136. The long-range communication channel 136 is a wireless data channel, such as those used by mobile phones to access the Internet, however the specific channel used is not contemplated by the present disclosure. The long-range communication may, for example, be established over wireless carrier system 14 or communication satellites 62 (discussed above).

The long-range transceiver 134 is configured to communicate with server 54 of data center 18. Long-range transceiver 134 is additionally configured to transmit to the remote server 54 at least one of the sensor data, object data, notification 143, and any information from memory module 160. Remote server 54 can wait for the sensor data, object data, notification 143, and any information from memory module 160 from the sign 100. The remote server 54 then communicates with a (second) long-range transceiver 200 located in a user's mobile device 57, or the approved vehicle, to relay the information from the sign 100.

The mobile device 57 may be configured modify the vehicle-share record information when mobile device 57 determines the data transmissions from server 54 include vehicle-share records information. Through mobile transceiver 200, mobile device 57 may transmit the modified vehicle-share records over the long-range communication channel to sign 100. Mobile device 57 may also include a short-range transceiver 201. This second short-range transceiver 201 allows mobile device 57 to transmit the modified vehicle-share records over the short-range communication channel to sign 100, for example, while within transmission range of the short-range communication channel 132.

In certain instances, the short-range communication channel 132 may be a near-field communication channel. In this way, the mobile device 57 is configured to detect being within a close proximity to short-range transceiver, for example, within three feet or when being pressed against a selected portion on sign 100. Mobile computing device 57 may then operate the second short-range transceiver 201 to transmit the modified vehicle-share records as one or more data transmissions over the short-range communication channel 132.

Method

Figure 3:
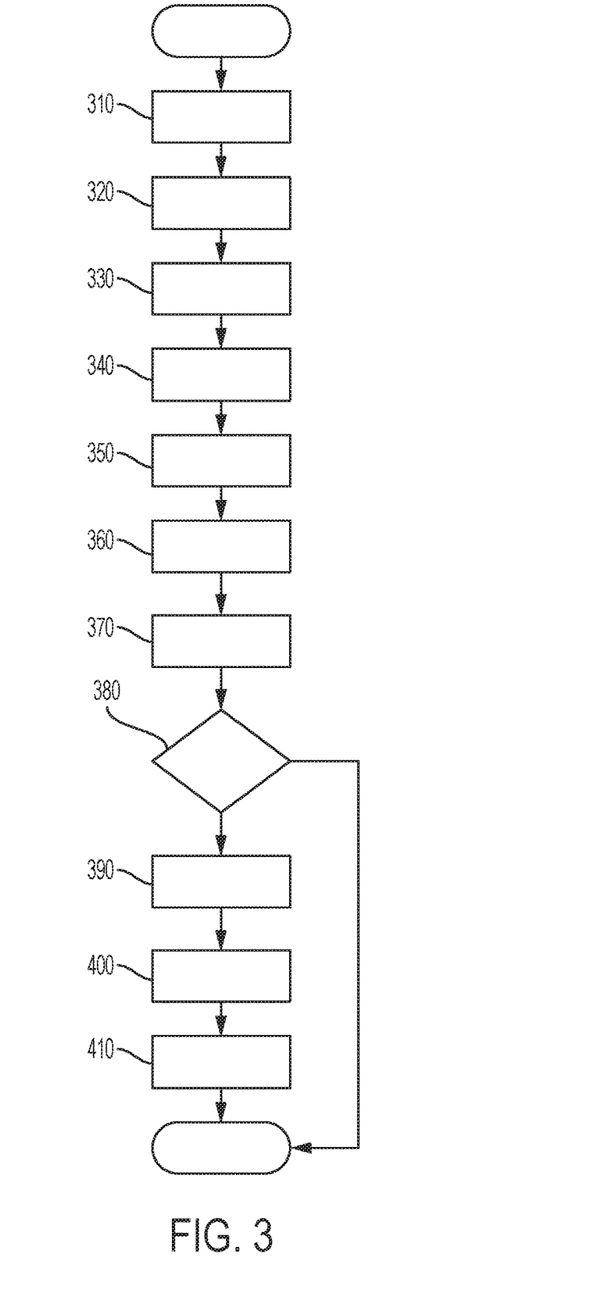
FIG. 3 is an exemplary flow representation of a method to exhibit vehicle information according to an aspect of the method presented herein.

Turning now to FIG. 3, there is shown an embodiment of a method 300 to exhibit vehicle information in and around a parking space. Method 300 is supported by telematics unit 24 being configured to communicate with communication device 156. This configuration may be made by a vehicle manufacturer at or around the time of the telematics unit's assembly or after-market. In at least one implementation, one or more instructions are provided to telematics unit 30 and stored on non-transitory computer-readable medium (e.g., on memory device 54). Method 300 is further supported by preconfiguring data center 20 to store the one or more vehicle-share records in database 84 and being accessible via server 82. Method 300 is further yet supported by preconfiguring processor module to generate notification information from received data transmissions having vehicle-share records or information corresponding as such. This configuration may be made by a sign manufacturer at or around the time of assembly. In at least one implementation, one or more instructions are provided to processor module 140 and stored on non-transitory computer-readable medium (e.g., on memory module 160).

In step 310, server 54 in data center 18 powers and starts operations of the long-range transceiver 170 located in its confines. In step 320, server 54 implements the long-range transceiver 190 to transmit the vehicle share records over the long-range communication channel 136. In step 330, the data transmissions are received at telematics unit 24. In this step, when vehicle 12 is away from parking space 110, the information within the data transmissions, for example, the vehicle-share records, may indefinitely be contained in electronic memory 40.

In step 340, telematics unit 24 may power and start operations of the communication device 156. In step 350, when vehicle 12 reaches the confines of the short-range communication channel 132, telematics unit 24 implements communication device 156 to transmit the vehicle-share records over the short-range communication channel 136.

In step 360, the data transmissions of the vehicle-share record information are received at short-range transceiver 130. In step 370, the data transmissions are communicated to processor module 140. In step 380, processor module 140 analyzes the data transmissions to review and determine that the vehicle-share records are sufficient to generate notification 143. If the records are sufficient, in step 390, processor module 140 will generate notification 143. Otherwise, processor module 140 will use the data transmission information for their respective function (not discussed herein) and method 300 ends.

In step 400, processor module 140 powers and starts operations of display 142 to exhibit information. In step 410, processor module 140 will exhibit the notification 143 via display 142. In step 400 or step 410, processor module 140 may optionally communicate the vehicle-share record information to memory module 160 to be stored for later use.

Optionally, method 300 can provide additional steps to further exhibit vehicle information in and around parking space 110. Such steps include sign 100 transmitting vehicle-share record information through short-range transceiver 130. Such short-range transmissions may be communicated, for instance, to computing devices such as mobile device 57. Thus, another additional step could include second short-range transceiver 201 receiving such data transmissions. Moreover, mobile device 57 can determine if the data transmissions have vehicle-share records within them as well as allow for modifications of such records. The modified records may then be transmitted via short-range communication channel 132 back to sign 100 (which may be embodied as a near-field communication channel). Further yet, mobile device 57 can operate long-range transceiver 200 and transmit the vehicle-share records to data center 18 and server 54.

In certain embodiments of this method, communication device 156 can incorporate the vehicle identification key 154. As such, optional steps may include, processor module 140 determining whether data transmissions include vehicle identification key 154 and generating an alert 143 when an unapproved vehicle is identified to be in the parking space 110, as discussed above. In other embodiments, vehicle 12 incorporates one or more VSMs 44. As such, optional steps may include, communicating the diagnostic data via communication device 156 over the short-range communication channel 132. In other embodiments, sign 100 may include a motion sensor 120 and camera 121. As such, optional steps may include, motion being detected by sensor 120, generating motion data, and having that motion data be received at processor module 140. Moreover, in these steps, processor module can operate camera 121 to record images of parking space 110.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

The invention claimed is:

1. A system to exhibit vehicle information, the system comprising: a data center comprising:
    a memory configured to store one or more vehicle-share records, wherein the one or more vehicle-share records are related to vehicle sharing and self-serve vehicle rental services, wherein the vehicle-share records comprise vehicle-share services reservation account information, vehicle reservation time-share information, and vehicle return expectation information;
    a long-range transceiver configured to transmit and receive one or more data transmissions over a long-range communication channel;
    a server configured to communicably couple with the memory and long-range transceiver, the server configured to operate the long-range transceiver to transmit the vehicle-share records as data transmissions over the long-range communication channel; a vehicle comprising:
    a communication device configured to transmit and receive one or more data transmissions over a short-range communication channel;
    a telematics unit configured to communicably couple with the communication device, the telematics unit configured to transmit and receive one or more data transmissions over the long-range communication channel, the telematics unit configured to operate the communication device to transmit one or more data transmissions over the short-range communication channel;
    a parking sign associated with a parking space, wherein the parking sign and parking space are related to the vehicle sharing and self-serve vehicle rental services, the parking sign comprising:
        a short-range transceiver configured to transmit and receive one or more data transmissions over the short-range communication channel;
        a graphics display, wherein the graphics display is a liquid crystal display (LCD), light emitting diode (LED) display, or organic light emitting diodes (OLEO) display, the graphics display configured to exhibit information; and
        a processor module configured to communicably couple with the short-range transceiver and the display, the processor module configured to receive the one or more data transmissions from the short-range transceiver,
        wherein the processor module is configured to generate a notification when the processor module determines that the one or more data transmissions comprise vehicle-share records information sufficient to generate the notification, wherein, based on the one or more vehicle-share records, the notification comprises vehicle-share services reservation account information, vehicle reservation time-share information, vehicle return expectation information, and wherein the processor module is further configured to operate the display to exhibit the notification
    a mobile computing device comprising a second long-range transceiver configured to transmit and receive one or more data transmissions over the long-range communication channel;
    wherein the mobile computing device is configured to receive the one or more data transmissions comprising the vehicle-share records information from the second long-range transceiver, wherein the mobile computing device is configured to generate modified vehicle-share records when the mobile computing device determines that the one or more data transmissions comprise vehicle-share records information, and wherein the mobile computing device is configured to operate the second long-range transceiver to transmit the modified vehicle-share records as one or more data transmissions over the long-range communication channel wherein the modified vehicle-share records are based on the vehicle-share records information;
    wherein the mobile computing device further comprising a second short-range transceiver configured to communicate one or more data transmissions over the short-range communication channel; and wherein the mobile computing device is configured to operate the second short-range transceiver to transmit the modified vehicle-share records as one or more data transmissions over the short-range communication channel;
    wherein the short-range communication channel is a near-field communication channel, and wherein the mobile computing device is configured to detect
    being pressed against a selected portion of the parking sign, and
    wherein the mobile computing device is configured to operate the second short-range transceiver to transmit the modified vehicle-share records as one or more data transmissions over the short-range communication channel when being pressed against the selected portion of the parking sign.

2. The system of claim 1, further comprising a second memory on the sign, the second memory configured to store the vehicle-share records information or the notification or some combination thereof, wherein the short-range transceiver is further configured to transmit the stored vehicle-share records information or the notification or both the vehicle-share records information and the notification as one or more data transmissions over the short-range communication channel.

3. The system of claim 1, further comprising:
    a mobile computing device comprising a second long-range transceiver configured to transmit and receive one or more data transmissions over the long-range communication channel; and
    wherein the mobile computing device is configured to receive the one or more data transmissions comprising the vehicle-share records information from the second long-range transceiver, wherein the mobile computing device is configured to generate modified vehicle-share records when the mobile computing device determines that the one or more data transmissions comprise vehicle-share records information, and wherein the mobile computing device is configured to operate the second long-range transceiver to transmit the modified vehicle-share records as one or more data transmissions over the long-range communication channel wherein the modified vehicle-share records are based on the vehicle-share records information.

4. The system of claim 3, wherein:
the mobile computing device further comprising a second short-range transceiver configured to communicate one or more data transmissions over the short-range communication channel; and
wherein the mobile computing device is configured to operate the second short-range transceiver to transmit the modified vehicle-share records as one or more data transmissions over the short-range communication channel.

5. The system of claim 4, wherein the short-range communication channel is a near-field communication channel, and wherein the mobile computing device is configured to detect being pressed against a selected portion of the parking sign, and wherein the mobile computing device is configured to operate the second short-range transceiver to transmit the modified vehicle-share records as one or more data transmissions over the short-range communication channel when being pressed against the selected portion of the parking sign.

6. The system of claim 1, wherein:
the communication device further configured to transmit a virtual vehicle identification key over the short-range communication channel;
the short-range transceiver further configured to receive the virtual vehicle identification key over the short-range communication channel; and
wherein the notification comprises an alert when an unapproved vehicle is identified to be in the parking space upon on a determination of the vehicle identification key status of the processor module.

7. The system of claim 1, wherein:
the vehicle further comprises a sensor configured to perform vehicle diagnostics to generate diagnostic data, the sensor configured to communicably couple with the telematics unit; and
the telematics unit configured to operate the communication device to transmit the diagnostic data as one or more data transmissions over the short-range communication channel.

8. The system of claim 1, wherein:
the sign further comprising a motion sensor and camera, the motion sensor configured to sense motion in the parking space and communicate motion data, the camera configured to record images of the parking space;
the processor module configured to communicably couple to the motion sensor and camera, the processor module configured to receive the motion data and subsequently operate the camera to record images of the parking space.

9. The system of claim 1, wherein:
the sign further comprising a camera configured to record images of the parking space;
the parking space comprising a ground sensor configured to sense an object in the parking space and communicate object data; and
the processor module configured to communicably couple to the ground sensor and camera, the processor module configured to receive the object data and subsequently operate the camera to record images of the parking space.

10. A method for exhibiting vehicle information, the method comprising:
providing a data center comprising:
a memory configured to store one or more vehicle-share records, wherein the one or more vehicle-share records are related to vehicle sharing and self-serve vehicle rental services, wherein the vehicle-share records comprise vehicle-share services reservation account information, vehicle reservation time-share information, and vehicle return expectation information;
a long-range transceiver configured to transmit and receive one or more data transmissions over a long-range communication channel;
a server configured to communicably couple with the memory and long-range transceiver;
providing a vehicle comprising:
a communication device configured to transmit and receive one or more data transmissions over a short-range communication channel;
a telematics unit configured to communicably couple with the communication device, the telematics unit configured to transmit and receive one or more data transmissions over the long-range communication channel, the telematics unit configured to operate the communication device to transmit the data transmissions over the short-range communication channel;
providing a parking sign associated with a parking space, wherein the parking sign and parking space are related to the vehicle sharing and self-serve vehicle rental services, the parking sign comprising:
a short-range transceiver configured to transmit and receive one or more data transmissions over the short-range communication channel;
a graphics display, wherein the graphics display is a liquid crystal display (LCD), light emitting diode (LED) display, or organic light emitting diodes (OLEO) display, the graphics display configured to exhibit information; and
a processor module configured to communicably couple with the short-range transceiver and the display, the processor module configured to receive the one or more data transmissions from the short-range transceiver; operating the long-range transceiver, via the server, to transmit data transmissions;
transmitting, via the long-range transceiver, data transmissions comprising the vehicle-share records over the long-range communication channel;
receiving the data transmissions, via the telematics unit;
operating the communication device, via the telematics unit, to transmit the data transmissions over the short-range communication channel;
transmitting one or more data transmissions, via the communication device, over the short-range communication channel;
receiving the data transmissions, via the short-range transceiver;
communicating the data transmissions, via the short-range transceiver, to the processor module;
determining, via the processor module, whether the data transmissions comprise vehicle-share records information;
generating a notification, via the processor module, when it is determined the data transmissions comprise vehicle-share records information sufficient to generate the notification, wherein, based on the one or more vehicle-share records, the notification comprises vehicle-share services reservation account information, vehicle reservation time-share information, vehicle return expectation information; and operating, via the processor module, the display to exhibit information; and exhibiting the notification, via the display;

providing a mobile computing device comprising a second long-range transceiver configured to transmit and receive one or more data transmissions over the long-range communication channel;

receiving, via the mobile computing device, data transmissions from the second long-range transceiver;

determining, via the mobile computing device, that the data transmissions comprise vehicle-share records information;

modifying, via the mobile computing device, the vehicle-share records when the data transmissions comprise vehicle-share records information;

operating, via the mobile computing device, the second long-range transceiver to transmit the modified vehicle-share records as data transmissions over the long-range communication channel; and transmitting, via the second long-range transceiver, the modified vehicle-share records as data transmissions over the long-range communication channel;

providing a second short-range transceiver on the mobile computing device, the second short-range transceiver configured to communicate one or more data transmissions over the short-range communication channel;

operating, via the mobile computing device, the second short-range transceiver to transmit the modified vehicle-share records as data transmissions over the short-range communication channel; and transmitting, via the second short-range transceiver, the modified vehicle-share records as data transmissions over the short-range communication channel;

wherein the short-range communication channel is a near-field communication channel; detecting, via the mobile computing device, when the mobile computing device is pressed against a selected portion of the parking sign;

operating, via the mobile computing device, the second short-range transceiver to transmit the modified vehicle-share records as data transmissions over the short-range communication channel; and transmitting, via the short-range communication channel, the modified vehicle-share records as data transmissions over the short-range communication channel while the mobile computing device is pressed against a selected portion of the parking sign.

11. The method of claim 10, further comprising:

providing a second memory on the sign, the second memory configured to store the vehicle-share records information or the notification or some combination thereof;

providing the short-range transceiver to be further configured to transmit the stored vehicle-share records information or the notification or both the vehicle-share records information and the notification as one or more data transmissions over the short-range communication channel;

storing, the second memory, the vehicle-share records information or the notification or both the vehicle-share records information and the notification; and transmitting, via the short-range transceiver, data transmissions comprising the stored vehicle-share records information or the notification or both the vehicle-share records information and the notification over the short-range communication channel.

12. The method of claim 10, further comprising:

wherein the communication device further configured to transmit a virtual vehicle identification key over the short-range communication channel;

determining, via the processor module, whether data transmissions comprise the virtual vehicle identification key; and generating, when no virtual vehicle identification key is determined to be in the data transmissions, via the processor module, a notification comprising an alert when an unapproved vehicle is identified to be in the parking space.

13. The method of claim 10, further comprising:

wherein the vehicle further comprises a sensor configured to perform vehicle diagnostics to generate diagnostic data, the sensor configured to communicably couple with the telematics unit;

communicating, via the sensor, diagnostic data to the telematics unit;

operating, via the telematics unit, the communication device to transmit data transmissions; and transmitting, via the communication device, the sensor data as one or more data transmissions over the short-range communication channel.

14. The method of claim 10, further comprising:

wherein the sign further comprising a motion sensor and camera, the motion sensor configured to sense motion in the parking space and communicate motion data, the camera configured to record images of the parking space;

wherein the processor module configured to communicably couple to the motion sensor and camera;

receiving, via the processor module, the motion data; and operating the camera, via the processor module, to record images of the parking space.

15. The method of claim 10, further comprising:

wherein the sign further comprising a camera configured to record images of the parking space;

wherein the parking space comprising a ground sensor configured to sense an object in the parking space and communicate object data; and wherein the processor module configured to communicably couple to the ground sensor and camera, the processor module configured to receive the object data and subsequently operate the camera to record images of the parking space; and receiving, from the ground sensor, the object data; and operating the camera, via the processor module, to record images of the parking space.

* * * * *